United States Patent Office 3,654,268
Patented Apr. 4, 1972

3,654,268
PRODUCTION OF CAPROLACTAM
Edwin George Edward Hawkins, Lower Kingswood, Surrey, England, assignor to BP Chemicals (U.K.) Limited, London, England
No Drawing. Filed Dec. 9, 1968, Ser. No. 782,475
Claims priority, application Great Britain, Dec. 15, 1967, 57,228/67
Int. Cl. C07d 41/06
U.S. Cl. 260—239.3 A        10 Claims

ABSTRACT OF THE DISCLOSURE

Cyclohexanone is converted to 1,1'-peroxydicyclohexylamine which is then heated in the liquid phase to produce caprolactam and cyclohexanone, which cyclohexanone is recycled as feed to the process.

---

The present invention relates to a process for the production of chemical compounds and in particular to a process for the production of lactams.

According to the present invention the process for the production of caprolactam comprises converting cyclohexanone to 1,1'-peroxydicyclohexylamine, followed by heating the 1,1'-peroxydicyclohexylamine in the liquid phase to produce caprolactam and cyclohexanone and recycling cyclohexanone as feed to the process.

Cyclohexanone may be converted to 1,1'-peroxydicyclohexylamine by reacting the cyclohexanone with hydrogen peroxide to give 1,1'-dihydroxydicyclohexyl peroxide followed by reaction of the 1,1'-dihydroxydicyclohexyl peroxide with ammonia. The reaction to give 1,1'-dihydroxydicyclohexyl peroxide may take place in the presence of ammonia and in a subsequent reaction this ammonia will react with the 1,1'-dihydroxydicyclohexyl peroxide to give the amine. The rate of this latter reaction may be increased by raising the temperature of the reaction mixture after the formation of the 1,1'-dihydroxydicyclohexyl peroxide. Alternatively the cyclohexanone may be converted to 1,1'-peroxydicyclohexylamine in a single step by simultaneous reaction with hydrogen peroxide and ammonia. 1,1'-peroxydicyclohexylamine and processes for its production are described in Belgian Pat. No. 701,327 and British applications 56342/66 and corresponding U.S. application Ser. No. 689,777, filed Dec. 12, 1967, and 24271/67 and corresponding U.S. application Ser. No. 727,716, filed May 8, 1968, now U.S. Pat. No. 3,576,817.

The hydrogen peroxide required for the process of the present invention may be provided from any convenient source. The hydrogen peroxide may be in the form not only of an aqueous solution but also in the form of a solution in organic liquids. Thus the hydrogen peroxide may be provided in the form of "isopropanol oxidate." Isopropanol oxidate is a peroxidic material obtained by oxidation of isopropanol with molecular oxygen under conditions which are well known in the art. The formation of isopropanol oxidate is for example disclosed in British Pat. 708,339.

The reaction of the hydrogen peroxide and cyclohexanone is preferably carried out in the presence of stabilizers for example sodium ethylene diamine tetraacetate, sodium metasilicate, sodium pyrophosphate, and sodium biphosphate. Sodium ethylene diamine tetraacetate is the preferred stabilizer. It may be desirable to use quite large quantities of stabiliser for example quantities in the range 10–30 grams of stabilizer per mole of hydrogen peroxide.

The reaction to produce the 1,1'-peroxydicyclohexylamine may be carried out batchwise or continuously. The reaction system used may comprise a single reactor or a plurality of reactors in series. One or more plug flow reactors may be used in series with the stirred tank reactor or reactors. The total residence time in the reactors may vary within a moderately wide range. Thus an example of a particularly suitable range of times for the continuous reaction using a plurality of reactors in series is 7 to 10 hours.

The molar ratio of cyclohexanone to hydrogen peroxide brought into contact is preferably close to the stoichiometrical ratio which is 2:1. It is preferred to use a ratio slightly less than 2:1 e.g. 1.9:1.

As disclosed in British patent application 56342/66 and corresponding U.S. application Ser. No. 689,777, filed Dec. 12, 1967 ammonium acetate may be used as a catalyst. When ammonia is present in the reaction mixture the ammonium acetate may of course be formed in situ by adding acetic acid to the ammoniacal solution.

The 1,1'-peroxydicyclohexylamine is heated in the liquid phase to produce caprolactam and cyclohexanone either with or without a catalyst. Processes for producing caprolactam and cyclohexanone from 1,1'-peroxydicyclohexylamine are described in Belgian Pat. 704,214 and in British applications 25686/67 and corresponding U.S. application Ser. No. 730,941, filed May 21, 1968; 26076/67 and corresponding U.S. application Ser. No. 731,291, filed May 22, 1968, now U.S. Pat. No. 3,583,982; 51095/67 cognate and corresponding U.S. application Ser. No. 765,652, filed Oct. 7, 1968, now U.S. Pat. No. 3,590,032, and British Pat. No. 1,198,431.

Thus the cleavage may be carried out in the presence, as catalysts, of salts of Groups I–A and II–A of the Periodic Table of the elements (as shown on page 30 of "Inorganic Chemistry" by Cotton and Wilkinson (1962). Thus lithium, soidum, potassium and magnesium salts, and salts of the alkaline earth meals, e.g. calcium, barium and strontium, may be used. The salt is preferably a lithium halide e.g. lithium chloride or bromide. The reaction may be carried out in an added solvent but it is convenient to use the caprolactam product as the reaction medium and it is preferred therefore to carry out the reaction in a molten caprolactam environment. In other words caprolactam is the major component of the reaction medium into which the 1,1'-peroxydicyclohexylamine is fed.

The cyclohexanone is recovered for recycle to the reaction in which it is converted to 1,1'-peroxydicyclohexylamine in any convenient manner. Thus the cyclohexanone may be distilled off from the reaction mixture to leave a caprolactam residue or the cyclohexanone may be distilled off from the reaction mixture as it is formed. Thus if the reaction mixture is maintained at 100° to 115° C. and a pressure of 10 to 15 mm. Hg the cyclohexanone will distil from the reaction mixture as it is formed. If any solvents are present these should preferably not be low boiling or they will distil with the cyclohexanone. Alternatively the cyclohexanone may be distilled from the reaction product after the reaction is complete.

The caprolactam may then be recovered from the residual reaction mixture by distillation, or by extraction with solvents. Examples of solvents which may be used are aromatic compounds, e.g. benzene, xylene and chlorinated hydrocarbons, especially the chlorinated lower aliphatic hydrocarbons, e.g. methylene chloride, chloroform and dichloroethane. Ethers, e.g. diethyl ether may be used. Where alkali metal hydroxides or alkoxides are present in the reaction mixture it may be necessary to add water, which may optionally be acidified, to the reaction mixture before extraction. Alternatively the extraction may be carried out in the absence of water by process of British Pat. No. 1,198,428, in which caprolactam is separated from mixtures of (a) alkali metal or alkaline earth metal hydroxides, alkoxides, and aryl oxides and (b) methanol by extraction with a liquid hydrocarbon.

In an alternative method of recovery the caprolactam and cyclohexanone are co-distilled from the reaction mixture and then separated from each other by fractionation.

The cyclohexanone may be recycled to the reaction in which it is converted to 1,1'-peroxydicyclohexylamine in any convenient manner. Where the conversion is carried out continuously the cyclohexanone may be piped directly from the recovery stage to the conversion. Storage tanks may be provided to hold some of the recycled cyclohexanone before it is discharged to the conversion reaction thus enabling the feed rate in the conversion reaction to be isolated to some extent from any fluctuations in the rate at which cyclohexanone is recovered.

The invention will now be illustrated by means of the following example in which all temperatures are in degrees celsus.

EXAMPLE

Lithium chloride, 0.50 mole was stirred with caprolactam, 0.466 mole in glass reactor maintained at 105–108°, 15 mm. Hg pressure. The reactor was equipped with cooling coils and a distillation head. An oil containing cyclohexanone, (0.10 mole) and 1,1'-peroxydicyclohexylamine, (1.40 mole) prepared by the reaction of cyclohexanone, hydrogen peroxide and ammonia was fed to the reactor over 1.5 hours and cyclohexanone was removed continuously as a distillate. When all the peroxyamine had been fed the reactor was maintained at 105–108°, 15 mm. Hg for a further 0.8 hours. The cyclohexanone distillate (120.2 g.) and the residual product were analysed and the yields (moles product made per 100 moles peroxyamine fed) were: caprolactam, 90; cyclohexanone 94; caproamide and hexenamide, 7.1; and cyclohexenylcyclohexanone, 1.3%.

The cyclohexanone distillate, 118 grams (96.4% pure by Gas Phase Chromatography); 880 ammonia solution, 90.6 ml.; disodium salt of ethylenediaminetetra acetic acid, 1.3 grams and ammonium acetate, 12.6 grams were mixed and cooled to 0°. Hydrogen peroxide solution, 72.5 ml. (28% w./v. $H_2O_2$) was added slowly to the mixture at 0°, then the reactants were warmed to 40° and stirred at this temperature for 2 hours whilst ammonia, 17 litres/hour was fed into the solution. The aqueous product solution was extracted with 40/60 petroleum ether, 10× 50 ml.; most of the ether evaporated off and the crude peroxyamine crystallised at 0° centigrade. The total yield of 1,1'-peroxydicyclohexylamine (moles per 200 moles cyclohexanone fed) was 71%.

By "880 ammonia" as used in the example is meant an aqueous solution of ammonia having a relative density of 0.880.

By "40/60 petroleum ether" is meant a petroleum distillate fraction boiling in the range 40–60° C. at atmospheric pressure.

I claim:
1. A process for the production of caprolactam which comprises reacting cyclohexanone with hydrogen peroxide, and with ammonia to produce 1,1'-peroxydicyclohexylamine, heating the 1,1'-peroxydicyclohexylamine in the liquid phase to produce caprolactam and cyclohexanone, and recycling cyclohexanone as feed to the process.

2. The process according to claim 1 wherein the cyclohexanone is converted to 1,1'-peroxydicyclohexylamine by reaction with hydrogen peroxide to produce 1,1'-dihydroxydicyclohexyl peroxide followed by reaction of the 1,1'-dihydroxydicyclohexyl peroxide with ammonia.

3. The process according to claim 1 wherein the cyclohexanone, hydrogen peroxide and ammonia are reacted in a single stage.

4. The process according to claim 1 wherein the 1,1'-peroxydicyclohexylamine is produced in a continuous reaction carried out in a plurality of reactors in series.

5. The process according to claim 1 wherein the 1,1'-peroxydicyclohexylamine is heated in the liquid phase in the presence of a Group I-A or Group II-A salt.

6. A process for the production of caprolactam which comprises reacting cyclohexanone with hydrogen peroxide and with ammonia to produce 1,1'-peroxydicyclohexylamine, heating the 1,1'-peroxydicyclohexylamine in the liquid phase in the presence of lithium halide to produce caprolactam and cyclohexanone, and recycling cyclohexanone as feed to the process.

7. The process according to claim 6 wherein the lithium halide is lithium chloride.

8. The process according to claim 6 wherein the lithium halide is lithium bromide.

9. The process according to claim 6 wherein the heating of the 1,1'-peroxydicyclohexylamine is carried out in a molten caprolactam environment.

10. The process according to claim 1 wherein the cyclohexanone is distilled off from the reaction to leave a caprolactam residue.

References Cited

FOREIGN PATENTS

| 701,327 | 1/1968 | Belgium. |
|---|---|---|
| 704,214 | 3/1968 | Belgium. |
| 1,537,517 | 7/1968 | France. |

OTHER REFERENCES

Roberts et al.: "Basic Principles of Organic Chemistry," pp. 384–386 (Benjamin) (1964).

Derwent's "Belgian Patents Reports" Abstracting Belgian Patents Serial. Nos. 701,327 and 704,214, dated July 1, 1967 and Sept. 22, 1967 respectively.

HENRY R. JILES, Primary Examiner

R. T. BOND, Assistant Examiner

U.S. Cl. X.R.

260—307 R